United States Patent [19]

Ransohoff et al.

[11] Patent Number: 4,657,467

[45] Date of Patent: Apr. 14, 1987

[54] CANISTER HANDLING SYSTEM

[75] Inventors: Jackson A. Ransohoff, Bethesda; Edward A. Wentz, Gaithersburg; Walter C. Snyder, Frederick, all of Md.

[73] Assignee: Neutron Products, Inc., Dickerson, Md.

[21] Appl. No.: 840,479

[22] Filed: Mar. 14, 1986

Related U.S. Application Data

[63] Continuation of Ser. No. 573,686, Jan. 25, 1984, abandoned.

[51] Int. Cl.$^4$ .............................................. B65G 37/00
[52] U.S. Cl. .................................. 414/419; 198/465.4; 198/803.14; 220/408; 220/411; 410/47; 294/87.1; 294/86.4; 414/626
[58] Field of Search .................... 410/47, 49; 220/408, 220/409, 410, 411, 412, 413; 198/465.4, 803.14; 414/415, 418, 419, 785, 591, 626; 294/27.1, 32, 86.4, 87.1

[56] References Cited

U.S. PATENT DOCUMENTS

| | | | |
|---|---|---|---|
| 1,462,468 | 7/1923 | Schaller | 414/419 |
| 1,698,683 | 1/1929 | Reynolds | 220/408 X |
| 2,298,145 | 10/1942 | Merrylees | 294/86 R |
| 2,524,656 | 10/1950 | Eyster | 414/418 X |
| 2,648,298 | 8/1953 | Holbeck | 414/419 X |
| 3,141,560 | 7/1964 | Rink | 198/472 X |
| 3,420,392 | 1/1964 | Flint | 414/419 X |
| 3,880,294 | 4/1975 | Arseneault | 294/99 R |
| 3,975,260 | 8/1976 | Peyton et al. | 198/479 X |
| 3,982,681 | 9/1976 | Graves et al. | 220/410 X |
| 4,382,422 | 5/1983 | Eddy et al. | 198/479 X |

FOREIGN PATENT DOCUMENTS 681605 10/1952 United Kingdom ................ 414/415

*Primary Examiner*—Robert J. Spar
*Assistant Examiner*—Stuart J. Millman
*Attorney, Agent, or Firm*—Bernard, Rothwell & Brown

[57] ABSTRACT

In a canister handling system, a canister dumper has pentagonally arranged rows of holders on a structure which is rotatable about a horizontal axis for indexing the rows of holders from a vertical position, where the canisters are loaded, through two steps to a canister content unloading station where the contents are gravity unloaded, and then through a canister unloading station where the canisters are dropped from the holders. The canisters include vertical ribs defining an enlarged outside diameter which interlocks with curved carrier walls to retain the canisters on carriers.

10 Claims, 6 Drawing Figures

CANISTER HANDLING SYSTEM

This is a continuation of application Ser. No. 573,686 filed Jan. 25, 1984 now abandoned.

BACKGROUND OF THE INVENTION

1. Field of the Invention

The present invention relates to systems for handling canisters carrying product for treatment or processing, for example, systems for handling canisters in which monomer is converted to flocculant polymer as by exposure to ionizing radiation.

2. Description of the Prior Art

In the prior art, canisters lined with plastic bags receive a liquid monomer and are carried into a radiation chamber where the monomer is subjected to ionizing radiation to polymerize the monomer and form a solid radiation log with a rubber-like consistency which can be subsequently dissolved and used for various purposes. The canisters containing the polymerized material are removed from the radiation chamber and stored after which the polymerized material with the liner bag is then dumped from the canister for packing or further processing, and the canisters are cycled back for reuse as containers for receiving and processing additional monomer.

The canisters, after filling with the monomer, are transported in vertical carriers or racks which have rollers attached to the upper ends and supporting the carriers on overhead rails so that the carriers may be pushed to various processing stations. The prior art canisters are generally vertically oriented cylindrical plastic containers with an open top, and the carriers include a pair of vertically-extending horizontally arcuate members having vertically-spaced disc-like shelves attached therebetween with one side being open for receiving the containers on the shelves. A spring biased chain is secured over the open side of the carrier to retain the containers therein and to prevent their falling from the carrier during processing. After polymerization, the containers are removed from the carrier and the polymerized material dumped by manually inverting the containers.

The prior art canister handling methods are relatively costly in requiring manpower to lift and invert each canister to dump the polyermized material from the canisters. Also, the manual effort required to remove the logs of polymerized material often resulted in physiological stress causing higher than normal rates of sick leave. The spring biased chains holding the prior art canisters in the carriers are subject to breaking and to catching on objects or clothing while the carriers are being handled or rotated.

SUMMARY OF THE INVENTION

In a first aspect, the present invention is summarized in a canister handling system including a structure rotatable about a horizontal axis and supporting a plurality of holders for gripping the containers in a circular arrangement tangentially on the periphery of the carrier wherein the holders are indexed through a loading station where the canisters are received upright by the holders, a content unloading station where the canisters are partially inverted to gravity unload the contents of the canisters, and a canister unloading station where the canisters are unloaded from the holders.

In a second aspect of the invention, a carrier and canister arrangement for handling a material includes a canister having outside vertical rib means which protrudes sufficiently so that the canister, after insertion, can be rotated in the carrier to a position where the ribs interlock with the arcuate side walls of the carrier to retain the canisters within the carrier.

An object of the invention is to substantially reduce the amount of manual effort required to handle canisters.

Another object of the invention is to construct a canister handling system which is relatively inexpensive and efficient.

One advantage of the invention is that the productivity of canister processing operation is increased with a decrease in the number of operators required.

Other objects, advantages and features of the invention will be apparent from the following description of the preferred embodiment taken in conjunction with the accompanying drawings.

DESCRIPTION OF THE PREFERRED EMBODIMENT

Figure 1:
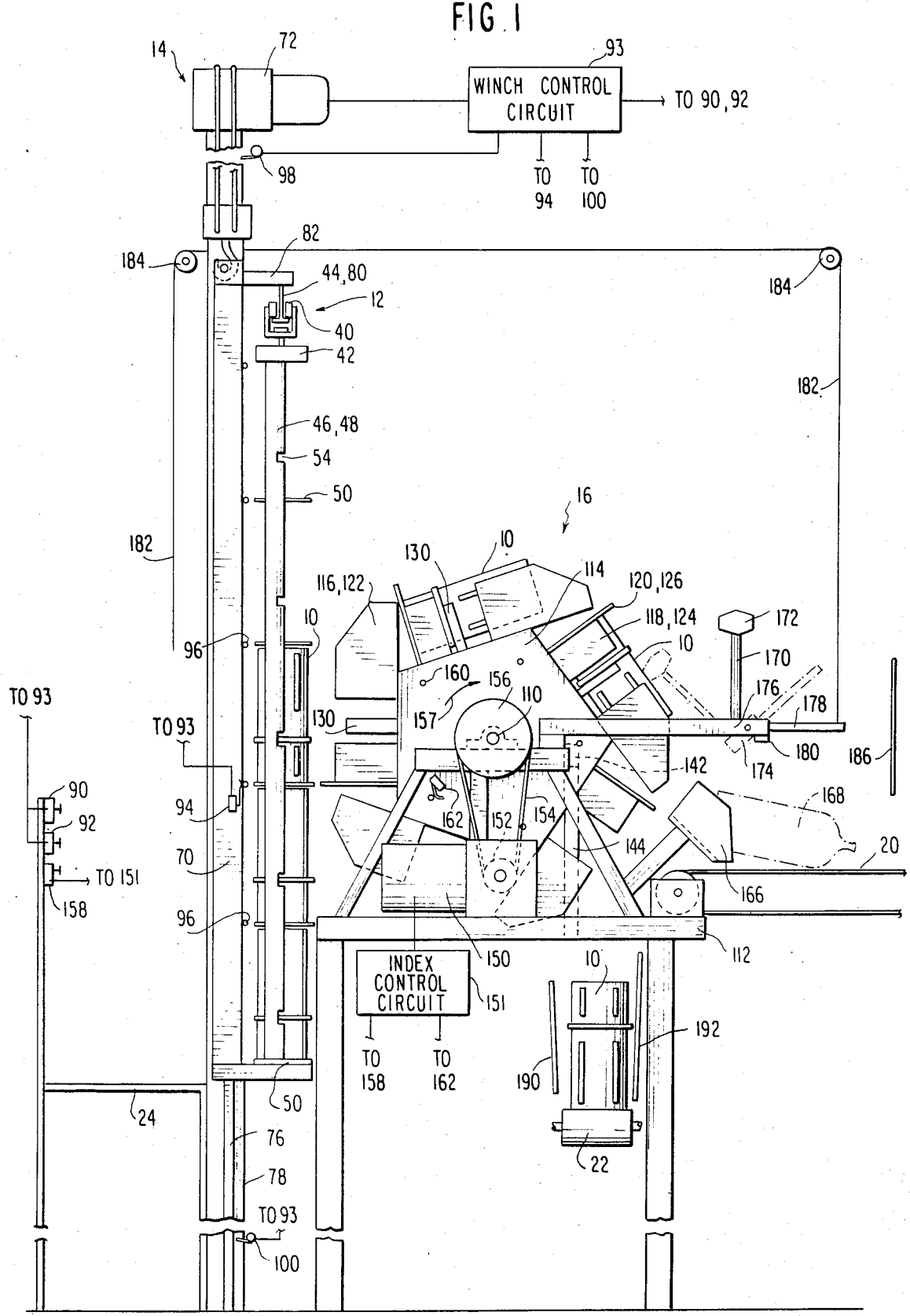
FIG. 1 is a side elevation view, taken from the right side, of a canister handling system in accordance with the invention.

One embodiment of a canister handling system as shown in FIG. 1, includes canisters 10 supported in vertically-extending carriers indicated generally at 12, an elevator mechanism indicated generally at 14 for raising and lowering a train of the carriers 12, and an unloading mechanism indicated generally at 16 for receiving the containers 10 and dumping their contents onto a conveyor 20 and for dropping the emptied canisters 10 onto a second conveyor 22. The canisters 10 and carriers 12 are particularly designed to carry a material, such as a liquid monomer, through a polymerization process, such as exposure to ionizing radiation in a shielded chamber forming the monomer into a solid polymer gel, but the present canister handling system can be utilized in the treating or handling of any suitable material which can be handled by a canister arrangement. The canister dumping mechanism 16 rotates the canisters 10 to a partially inverted position where the contents are gravity discharged onto the conveyor 20 which leads to a subsequent processing station such as a packing station for packing the discharged material suitable for shipment. The emptied canisters are deposited on the conveyor 22 which carries the canister to a station, such as a cleaning station, in the reuse of the canisters.

Figure 2:
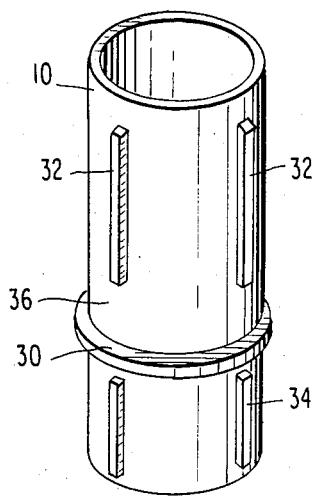
FIG. 2 is a perspective view of a canister utilized in the invention.

As shown in FIG. 2, each of the canisters 10 has a vertically-extending cylindrical or tubular wall which is closed at the bottom and open at the top. A horizontal ring-like rib 30 extends around the outer surface of the wall at a height equal to approximately one-third of the total height above the bottom of the canister. One or more vertical ribs, such as four equally spaced vertical ribs 32, extend on the outer surface of the canister 10 above the rib 30 while similar shorter sections of ribs 34 aligned with the ribs 32 extend on the outer surface of the canister below the horizontal rib 30. The horizontal rib 30 is particularly designed to cooperate with clamping arms and the unloading apparatus of FIG. 1 to prevent the canister from sliding from the unloading apparatus when the canister is inverted to unload the contents. The bottom ends of the vertical ribs 32 are spaced above the horizontal rib 30 sufficiently to leave rib-free sections 36 of the outer cylindrical surface of the canister 10 suitable for being engaged by the clamps. The canister 10 and its ribs 30 and 32 are formed from a suitable material, such as integrally molded plastic which is not affected by the environment, in which the canister is utilized.

Figure 3:
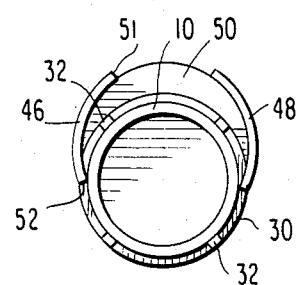
FIG. 3 is a cross-section view of a carrier and canister illustrating the loading of the canister into the carrier.
Figure 4:
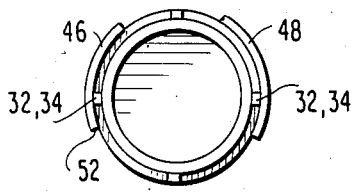
FIG. 4 is a view similar to FIG. 3 but showing the canister secured within the carrier.
Figure 5:
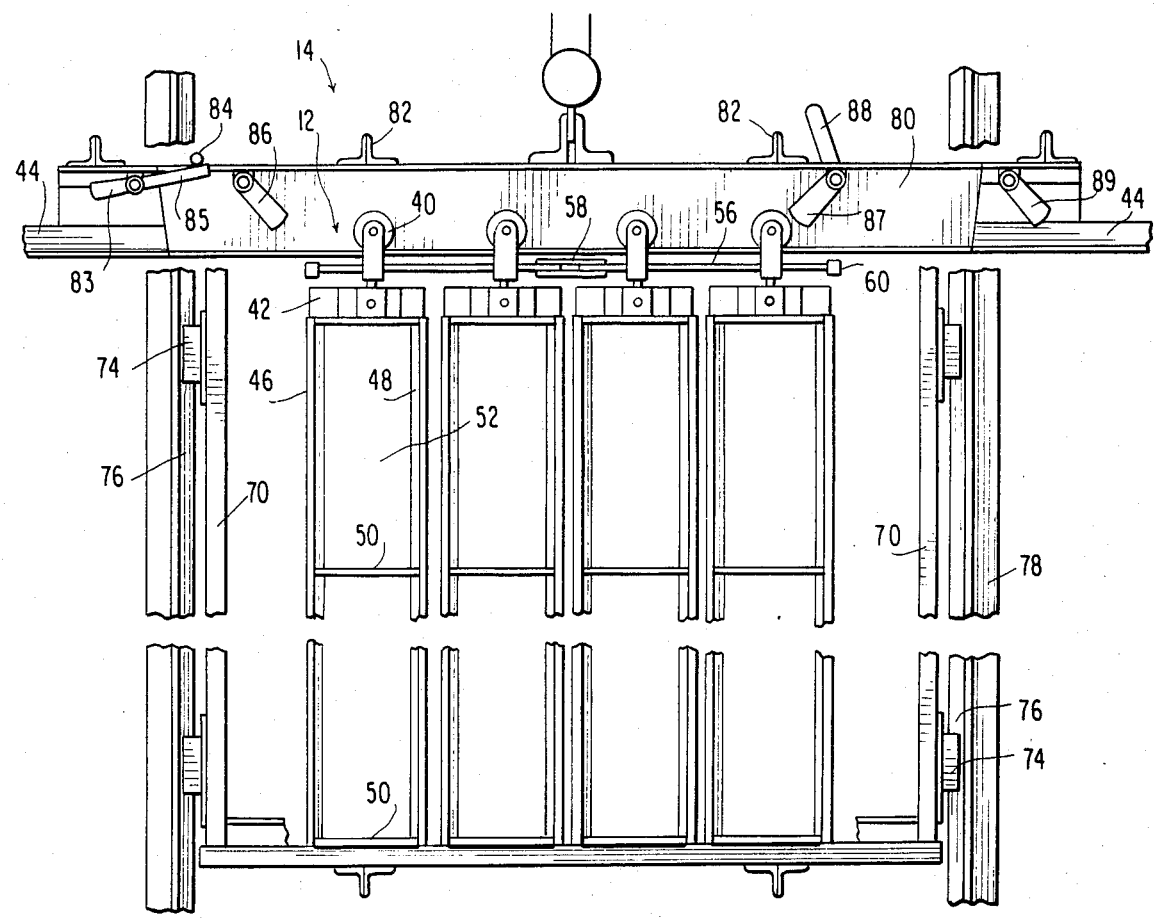
FIG. 5 is a front elevation view, with portions broken away, of a carrier elevator mechanism in the system of FIG. 1.

As shown in FIGS. 1 and 5, each of the carriers 12 has an upper double roller 40 rotatably mounted on the top of a header 42 for movably supporting the carrier on an inverted-T rail system 44. A pair of vertical wall members 46 and 48 extend downward from opposite sides of the header 42 and support spaced horizontal circular discs 50 forming shelves for supporting a plurality, for example four, canisters 10 in a vertically-stacked relationship. As shown in FIGS. 3 and 4, the horizontal cross-sections of the members 46 and 48 are arcuate and define sectors on opposite sides of the discs 50 with an inside diameter slightly greater than the diameter of the outside surface of the ribs 30, 32 and 34, to form partial side walls which with the shelves 50 define compartments in the carriers 12 for receiving the canisters 10. The wall members 46 and 48 leave a narrower vertical rear opening 51 and a wider front opening 52 which extends for an angle less than 180° of the discs 50. The width of the opening 52 defined by the front edges of the members 46 and 48 is selected to be less than the diameter of the outside surfaces of the ribs 32 and 34, but greater than the outside surface of the canister 10 so that the canister 10 can be inserted through the opening 52 when oriented as illustrated in FIG. 3 and is retained within the walls by the ribs 32 and 34 when rotated to the orientation shown in FIG. 4. Notches 54, see FIG. 1, are formed in the forward edges of the members 46 and 48 for passing the rib 30 during insertion and removal of the canister 10. Where pluralities of the ribs 32 and 34 are formed on the canisters 10, at least one pair of spaces must be left between ribs on opposite sides of the container for permitting the insertion as shown in FIG. 3. The employment of the vertical ribs 32 and 34 in combination with the particularly shaped vertical wall members 46 and 48 of the carriers enables the securement of the containers within the carriers without the need for chains or other fastening devices to ensure that the canisters do not fall from the carriers during handling and processing.

As shown in FIG. 5, a plurality of the carriers 12, such as four of the carriers, are joined into a train by a bar 56 which, for the example of the four-carrier train, is hinged at 58 to permit the train to negotiate curves. Bumpers 60 are attached to leading and trailing edges of the bar 56 for engaging bumpers of bars of succeeding and proceeding trains so that a plurality of trains may be advanced by pushing the trailing train along the rail 44.

Figure 6:
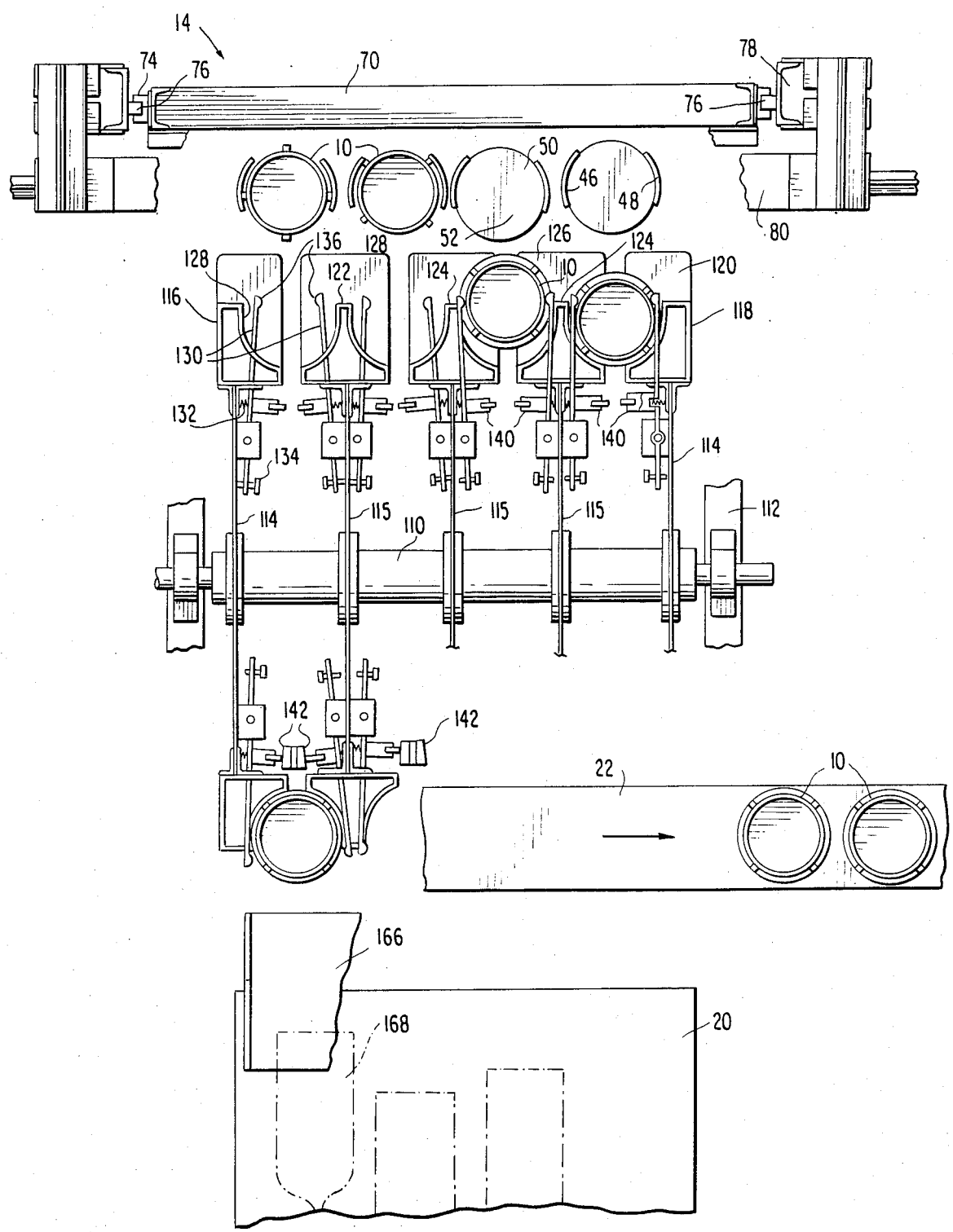
FIG. 6 is a horizontal section view of the system of FIG. 1 with various portions broken away, portions sectioned at different levels, and portions revolved to the horizontal from a non-horizontal plane.

The elevator 14 includes a vertically-slidable frame 70, FIGS. 1, 5 and 6, which is raised and lowered by an electrical motor-driven winch 72. Guides 74 with U-shaped horizontal cross-sections are mounted on the frames 70 and have low friction bushing material engaging vertical rails 76 mounted on stationary frame members 78 for guiding the frame 70 in upward and downward sliding movement. A section 80 of the rail system 44 is mounted by brackets 82 on the upper portion of the frame 70 for receiving one train of the carriers 12. The rail section 80 is beveled at its opposite ends so as to engage the stationary sections of the rail system 44 on its opposite ends when in a lowered position in order to ensure accurate positioning of the rail section 80.

A pivotal gravity biased stop 83 is mounted on the rail system 44 in front of the entrance end of the rail section 80 for engaging the rollers 40 to prevent passing of a train of carriers 12 past the stop 83 when the rail section 80 is raised. A pin 84 mounted on rail section 80 engages an arm 85 extending from the stop 83 when the rail section 80 is in the lowered position as shown in FIG. 5 to raise the stop 83 and permit the carriers to be loaded onto the rail section 80. Gravity biased pivotal stops 86 and 87 are mounted on the rail section 80 for retaining the train of carriers 12 thereon. An arm 88 may be manually rotated to release the end stop 87 to permit the train of carriers 12 to be unloaded. A similar gravity biased pivotal stop 89 is mounted on the rail system 44 at the exit end of the section 80 for preventing return of the carriers 12 onto the section 80 or into the space vacated when the section 80 is raised.

Push button switches 90 and 92 are provided for operating a winch control circuit 93 to raise and lower, respectively, the elevator 14. A microswitch 94 connected to the circuit 93 and suitably mounted on the stationary frame 78 is positioned for being engaged by pins 96 on the movable frame 70 for stopping upward movement of the elevator at positions for loading rows of the canisters 10 into the unloader mechanism 16. Upper and lower microswitches 98 and 100 are connected to the circuit 93 and are positioned to prevent excessive movement of the elevator beyond upper and lower limits.

The unloader mechanism 16, as illustrated in FIGS. 1 and 6, has five rows, including four holders each, for receiving and releasably gripping the canisters 10. A structure with a shaft 110 is rotatably mounted on a frame 112 and has five regular pentagonal support plates, including two outside plates 114 and three inside plates 115 mounted on the shaft 110. An upper holder member 116 and a lower holder member 118 with a shelf or plate 120 are mounted on each edge of the outside plates 114, and an upper holder member 122 and a lower holder member 124 with a support plate or shelf 126 are mounted on each edge of the inside plates 115 wherein the members 116 and 122, the members 118 and 124, and the shelves 120 and 126 are aligned in the respective rows. Contoured surfaces 128 are formed on the insides of the outer holder members 116 and 118 and on both sides of the inner holder members 122 and 124 parallel to the edges of the plates 114 and 115 for engaging the cylindrical canister 10. The shelves 120 and 126 extend perpendicular to the edges of the plates 114 and 115, and beyond the members 118 and 124 and their contoured surfaces at the bottoms of the lower members 118 and 124 for forming shelves to support the bottom of the canisters 10 in the loading station. Clamping arms 130 are pivotally mounted on the inside of each outer plate 114, and on both sides of each inner plate 115 and extend through the space between each pair of upper and lower members 116, 118, 122, and 124. Compression springs 132 mounted between the arms 130 and the plates 114 or 115 in front of the pivots bias the forward ends of the arms 130 against canisters received in the holders. Adjustable stops 134 are mounted on the rear ends of the arms 130 for determining the maximum rotative position of the arms 130 so that the canisters 10 may be easily pushed between the arms 130 by camming the forward ends of the arms 130 apart against the bias of springs 132. Half round tips 136 are formed on the forward ends of the arms 130 for engaging the respective sides of the canisters 10 to ensure their being held within the holders. Cam followers 140 are mounted on each of the clamp arms 136 and extend therefrom toward a center plane dividing each of the four spaces between the plates 114 and 115. Cams 142 for engaging the cam followers 140 to pivot the clamp arms 130 against the bias of springs 132 and release the arms from the canister 10 are mounted on the upper ends of each of four arms 144 which extend upward from the frame 112 along the planes bisecting the spaces between the plates 114 and 115.

An electric motor and speed reducer 150 controlled by index control circuit 151 drive a sprocket wheel 152 which is connected by a chain 154 to a drive sprocket 156 mounted on the shaft 110 for rotating the assembly of plates and holders in the direction of arrow 157 when initiated by operation of a push-button switch 158 connected to the index control circuit 151. Five equidistantly spaced pins 160 are mounted on the right side plate 114 for engaging a microswitch 162 connected to the circuit 151 to stop operation of the motor 150 at five index positions where a corresponding row of the holders is positioned at a loading station adjacent the elevator 12 receiving a row of canisters from the train of carriers 12.

At a contents unloading station defined by the second index position or 144° from the loading station, a chute 166 is suitably mounted on the frame 112 for directing the contents such as packaged logs of polymerized material 168 onto the conveyer 20. Four hammers 170 with rubber heads 172 are mounted on holders 174 which are pivotally mounted on frame members 176. Weighted arms 178 extend from the mounting members 174 perpendicular to the hammers 170 for gravity biasing the hammers in an upright position against a stop bar 180. Cords 182 are attached at one end to the respective arms 178 and pass over pulleys 184 to an operator station where an operator may actuate the hammers 170 for pounding the canisters 10 at the contents unloading station when failure to unload the contents 168 is observed through a mirror 186.

The conveyer 22 is positioned underneath the canister unloading station as determined by the position of the cams 142. This position is set to open the clamps 130 just before the canisters 10 reach an inverted vertical position, or about 180°, in rotation from the loading station. Guidewalls 190 and 192 are provided for aiding and directing the canisters 10 to upright upside positions on the conveyer 22.

In operation of the canister handling system of FIGS. 1-6, a train of the carriers 12 is pushed from the conveyer system past the raised stop 83 onto the elevator rail section 80, wherein the top most row of the canisters 10 within the four carriers 12 in the train are aligned with the holders formed by the members 116, 118, 122 and 124 and shelves 120 and 126 at the loading position. Each carrier 12 may be rotated about its pivot with the roller 40 so that its opening 52 faces the corresponding holder. The canister 10 within each holder is then rotated to the orientation shown in FIG. 3 and the canister 10 pushed through the opening 152 into the corresponding holder on the loading mechanism 16. It is noted that the holders at the loading station generally have a vertical orientation for receiving the canisters 10 in the vertical position.

After the topmost row of canisters has been loaded into the unloading mechanism 16, the push button switches 90 and 158 are operated to raise the elevator 14 to present the next row of canisters 10 in the carrier train to the loading station and to rotate or index the unloader mechanism 16 by a rotation of 72°. The next row of canisters in the carriers 12 is then aligned with the next row of holders on the unloading mechanism 16 and is loaded thereon as described above whereupon switches 90 and 158 are again operated. The loading of rows of canisters continues until the carriers 12 on the elevator are empty at which time push button switch 92 is operated to lower the elevator 14 to its lowermost position as shown in FIG. 5. The stop 87 is raised by manually rotating the arm 88 and the empty train of carriers is pushed from rail section 80 past stop 89 back onto the rail system 44. A new train of carriers can be unloaded as described above.

When the canisters 10 have been indexed twice or rotated through 144° by the unloader 16 to reach the contents unloading station, the canisters 10 are partially inverted. The contents or the packaged logs of polymerized material 168 will generally fall from the canisters 10 onto the chute 166 and the conveyer 20. However, one or more packages 168 may be stuck in the canisters 10 as observed through the mirror 186. The operator may then pull on the corresponding cord 182 to bang the corresponding hammer head 172 against the canister 10 and effect the release of the contents onto the conveyer 20.

During the next index cycle, the cam followers 140 engage the cams 142 to release the clamps 130 just as, or slightly before the row of empty canisters 10, passing from the contents unloading station, pass through an inverted vertical position. This results in the empty canisters 10 falling under the force of gravity from their holders onto the conveyer 22. The conveyer 22 carries the canisters then to a cleaning station (not shown) and to a further processing area where the canisters will be reloaded with monomer.

Continued rotation and indexing of the unloader mechanism 16 will return the holders to the loading position to receive additional rows of canisters 10 from trains of carriers 12.

The unloader mechanism 16 with five rows of canister holders positioned tangentially about the rotating support results in a improved and efficient operation. The canisters are loaded in a vertical position simply by pushing from the carriers 12, the canister contents are unloaded in a partially inverted position, and the emptied canisters are unloaded in the inverted position for easier handling at the subsequent cleaning station. By having five sides, the canister unloading position corresponds to one index stop of the unloader with the canisters oriented at 54° from the horizontal to unload the contents onto the conveyer 20. Other configurations of holders, such as arrangements of three rows of holders, and any combination containing more than five rows of holders may also be employed and have a stop position at the contents unloading station. The preferred five-sided arrangement has the particular advantage that the unloading angle is relatively steeper than a three-sided arrangement or a six-sided arrangement.

Since many modifications, variations and changes in detail may be made to the above-described embodiment, it is intended that all matter described in the foregoing description and shown in the accompanying drawings be interpreted as illustrative and not in a limiting sense.

What is claimed is:

1. A canister handling system comprising
a plurality of canisters wherein each canister has an outer wall surface defining a first diameter, and has vertical rib means defining a second outside diameter larger than the first diameter;
a plurality of movable carriers on a rail for receiving and transporting the canisters along a path, each of said carriers including vertical partially cylindrical wall means having horizontally arcuate cross sections defining a vertical opening which gas a width greater than the first diameter but less than the second diameter whereby a canister can be moved through the vertical opening in the carrier when the first diameter is oriented across the opening and is retained in the carrier when the second diameter is oriented across the opening;
a structure rotatable about a horizontal axis adjacent the path of the carriers;
a plurality of holders including means for releasably gripper canisters;
said holders being mounted tangentially in a circular arrangement on the periphery of the structure; and
means for indexing the structure and holders through a loading station where the canisters are received upright by the holders when the canisters are rotated to orient the first diameter across the opening and the canisters are pushed from the carriers into the holders, a content unloading station where the canisters are partially inverted to gravity unload the contents of the canisters, and a canister unloading station where the canisters are unloaded from the holders.

2. A canister handling system as claimed in claim 1 wherein the plurality of holders includes five holders mounted in five equally spaced positions about the periphery of the structure, and the indexing means rotates the holders to a position for receiving the canisters in a vertical position at the loading station and rotates the canisters 144° to the content unloading station.

3. A canister handling system as claimed in claim 2 wherein the canister unloading station is about 180° rotation from the loading station.

4. A canister handling system as claimed in claim 1 wherein the plurality of holders include pluralities of holders mounted in a plurality of horizontal rows wherein the plurality of rows are arranged in a circular arrangement tangentially on the periphery of the structure for receiving and unloading rows of canisters.

5. A canister handling system as claimed in claim 4 wherein the plurality of horizontal rows consist of five rows spaced equidistantly about the periphery of the structure, and the indexing means indexes each row to a vertical position in the loading station and to a 144° rotation from the vertical position in the contents unloading station.

6. A canister handling system as claimed in claim 5 wherein the gripping means of each of the holders comprises a pair of spring biased clamps for gripping the canisters, and the apparatus includes cam means at the canister unloading station for engaging the clamps to release the clamps from the canisters to gravity unload the canisters from the holders.

7. A canister handling system comprising a plurality of canisters, each having an outer wall surface defining a first diameter, and has vertical rib means defining a second outside diameter larger than the first diameter; a movable carrier for receiving and transporting one or more canisters, said carrier including vertical partially cylindrical wall means having horizontally arcuate cross sections defining a vertical opening which has width greater than the first diameter but less than the second diameter whereby a canister can be moved through the vertical opening in the the carrier when the first diameter is oriented across the opening and can be retained in the carrier when the second diameter is oriented across the opening;
a structure rotatable about a horizontal axis;
a plurality of holders including means for releasably gripping canisters;
said holders being mounted tangentially in a circular arrangement on the periphery of the structure;
means for indexing the structure and holders through a loading station where the canisters are received upright by the holders, a content unloading station where the canisters are partially inverted to gravity unload the contents of the canisters, and a canister unloading station where the canisters are unloaded from the holders;
said plurality of holders consisting of respective pluralities of holders mounted in five horizontal rows wherein the five rows are arranged in a circular arrangement tangentially equidistantly on the periphery of the structure for recieving and unloading rows of canisters;
said indexing means including means for indexing each row to a vertical position in the loading station and to a 144° rotation from the vertical position in the contents unloading station;
said gripping means of each of the holders including a pair of spring biased clamps for gripping the canisters;
cam means at the canister unloading station for engaging the clamps to release the clamps from the canisters to gravity unload the canisters from the holders; and
said canisters having a horizontal rib, said pairs of clamps being positioned to grip the canisters above the horizontal rib in the loading station so that the canister remains within the holder when inverted at the contents unloading station.

8. A canister handling system comprising
a canister for containing material and havng opposite outside vertical cylindrical surface portions defining a first outside diameter of the canister;
said canister having outside vertical rib means defining a second diameter of the canister greater than the first diameter;
rail means;
a movable carrier having a fixed horizontal shelf and vertical, partially cylindrical, fixed, rigid wall means defining a cylindrical compartment with a diameter greater than the second diameter for receiving and transporting the canister along the rail means; and said vertical, partially cylindrical, rigid wall means having horizontally arcuate cross sections defining a vertical opening extending less than 180° of the cylindrical compartment to define an opening width greater than the first diameter and less than the second diameter such that the canister can be moved through the opening when the first diameter is oriented across the opening and such that the canister is retained in the carrier when the second diameter is oriented across the opening.

9. A canister as claimed in claim 8 wherein the vertical rib means includes four vertical ribs equidistantly spaced about the periphery of the canister.

10. A canister handling system as claimed in claim 7 wherein the movable carrier includes a plurality of vertically spaced shelves for receiving a corresponding plurality of canisters, and the system includes elevator means for raising a plurality of the carriers to positions where the shelves are aligned with the holders at the loading station.

* * * * *